April 29, 1969  A. T. CAPE  3,441,215

POWDER SPRAY TORCH

Filed March 3, 1967

INVENTOR.
ARTHUR T. CAPE
BY
Isler & Ornstein
ATTORNEYS

United States Patent Office 3,441,215
Patented Apr. 29, 1969

3,441,215
POWDER SPRAY TORCH
Arthur T. Cape, Monterey, Calif., assignor to Coast Metals, Inc., Little Ferry, N.J., a corporation of Delaware
Filed Mar. 3, 1967, Ser. No. 620,305
Int. Cl. B05b 1/00, 1/30
U.S. Cl. 239—85                      9 Claims

ABSTRACT OF THE DISCLOSURE

The invention relates to a powder spray torch, having a powder metering valve mounted therein in a manner which facilitates installation and removal thereof for replacement purposes. Another feature is the incorporation of a novel perforated element in the powder hopper for preventing a receding flame or flashback in the torch from reaching the interior of the hopper, to thereby cause an explosion.

---

This invention relates generally to powder spray torches, but has reference more particularly to torches of the type described in my U.S. Patent No. 3,194,501.

In powder spray or melting torches of this general type, it is essential not only that means be provided for accurately feeding or metering the amount or volume of powder supplied by the hopper with which such torches are usually provided, but that suitable means be provided for preventing backflash to the powder in the hopper, so that damage to the torch is avoided, as well as injury to the user of the torch.

Attempts to accurately feed or meter the powder and to prevent backflash have heretofore been made in such torches, but such attempts have failed, for one reason or another.

It is essential, also, that torches of this type be manufactured with as simple a construction as possible, so as to bring the cost of the torch down to a point at which the torches can be sold at a low price and in commercially feasible quantities.

The present invention, accordingly, has, as one of its primary objectives, the provision of a torch of the character or type described, having means incorporated therein for positively and accurately feeding or metering the powder to the chamber in the torch from which the powder is propelled to the nozzle or tip of the torch.

Another of the primary objectives of the invention is to incorporate in a torch of the character or type described, means for positively preventing backflash in the torch from reaching the powder in the hopper, whereby to avoid damage to the torch and hopper, as well as injury to the user of the torch.

A further object of the invention is to provide a torch of the character or type described, which is of extremely simple construction, consisting of a minimum number of parts which can be quickly and easily assembled and disassembled, whereby the cost of the torch is reduced to a point at which the torch can be sold at a low price, and in commercially feasible quantities.

Other objects and advantages of my invention will be apparent during the course of the following description.

In the accompanying drawings forming a part of this specification, and in which like numerals are employed to designate like parts throughout the same, FIG. 1 is a fragmentary view, partly in elevation, and partly in vertical cross-section, of a torch embodying the improvements to which this invention relates;

Figure 1:
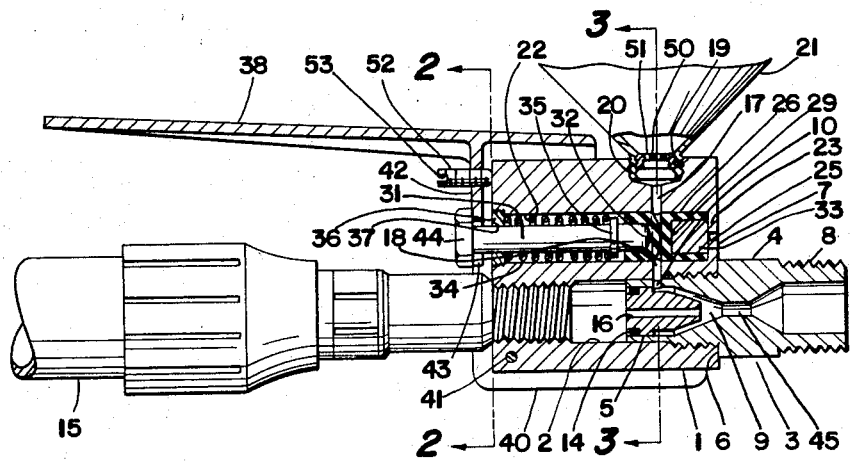
Figure 2:
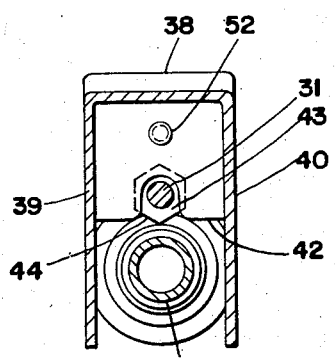
FIG. 2 is a transverse cross-sectional view, taken on the line 2—2 of FIG. 1.

Referring more particularly to the drawings, there is disclosed a torch having a torch body 1, having a longitudinal bore 2, in the forward end of which an injector assembly, generally designated by reference numeral 3, is threadedly secured.

The injector assembly 3 consists of a body section 4, and an injector tip or nozzle 5.

The body section 4 is provided with a shoulder 6 which abuts the forward face 7 of the body 1, when the injector assembly is properly secured to the body 1, and is provided with a threaded portion 8, to which the nozzle of the torch is secured by means of a coupling nut, neither of which are shown, but which may be readily understood by reference to my aforesaid patent, as well as in my U.S. Patents Nos. 3,281,077 and 3,281,078.

Figure 3:
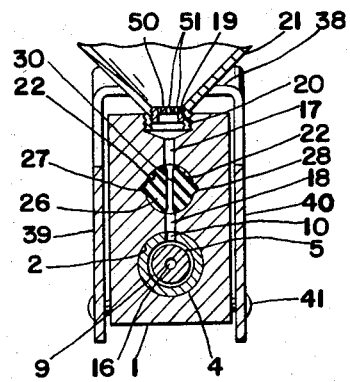
FIG. 3 is a transverse cross-sectional view, taken on the line 3—3 of FIG. 1.
Figure 4:
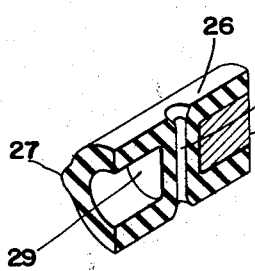
FIG. 4 is a longitudinal cross-sectional view, on an enlarged scale, of the powder metering valve of FIG. 1.
Figure 5:
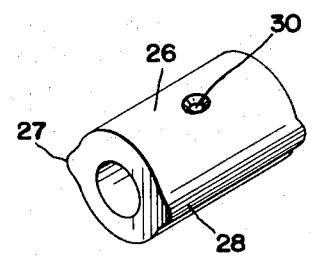
FIG. 5 is a perspective view of the powder metering valve.

The body section 4 is also provided with a chamber 9 into which a combustible gas mixture, such as oxygen and acetylene flows, as will be presently described. At the rear end of this chamber 9, the wall of the body section 4 is provided with an opening 10 (see FIG. 3).

The injector tip or nozzle 5 is secured in the rear end of the body section 4, as by a press-fit, and an O-ring seal 14 is provided to prevent leakage of gas through the joint between the injector tip and body section 4. The forward portion of the injector tip or nozzle 5 is spaced from the wall of the mixing chamber 9, so as to permit access of powder through the opening 10 to the chamber 9.

A torch butt or handle, fragmentarily indicated by reference numeral 15 in FIG. 1, is threadedly secured in the rear end of the bore 2 of the torch body, the torch butt being provided adjacent its rear end with knobs (not shown) which operate oxygen and fuel gas valves, for controlling the flow of such oxygen and fuel gas into the bore 2, and thence, through an axial passageway 16 into the mixing chamber 9.

The body 1 is also provided with aligned openings 17 and 18 for the passage of powder into the opening 10 and thence into the mixing chamber 9. The opening 17 is counterbored, as at 19, for the reception of the lower threaded end 20 of a powder-containing hopper 21, from which the powder is supplied to the opening 17.

For the purpose of controlling the flow of powder into the opening 18, the body 1 of the torch is provided with a cylindrical bore 22, which is substantially parallel with the bore 9, and which is closed at its forward end, as at 23, except for the provision of a small opening 25, which serves a purpose to be presently described.

Mounted in the forward portion of the bore 22 is a valve or valve insert 26 of elastomeric material such as neoprene, which is preferably a molded element.

The valve 26 is of cylindrical form, but is provided at its sides with longitudinally-extending ribs 27 and 28, which fit into corresponding longitudinal recesses in the wall of the bore 22 (see FIG. 3) when the valve is inserted endwise into the bore, so as to prevent rotation of the valve about its axis after the valve has been thus inserted.

The valve 26 includes a vertical bridge section or web 29 through which a vertically disposed powder metering passageway 30 extends, and which passageway is in alignment with the openings 17 and 18 when the valve is in proper position in the bore 22.

The passageway 30 of the valve is normally closed, as by means of a plunger 31 having a nose portion 32, which engages the web 29, as best shown in FIG. 1, and exerts sufficient pressure on the web to close the passageway 30. However, in order to prevent distortion of the web 29, and to provide a rigid seat or anvil for the web, a metallic plug 33 is adhesively secured in the valve behind the web, and fills the space between the web and the portion 23 of the body 1 of the torch, so that the plug cannot be displaced.

Pressure on the plunger 31 for closing the valve 26 is effected by means of a compression coil spring 34, disposed in the bore 22, and interposed between a flange 35 on the plunger and a nut 36 which is secured to the body 1 and closes the rear end of the bore 22. The plunger is slidable longitudinally in an opening 37 of the nut 36.

For the purpose of permitting the valve 26 to open, that is to say, to permit the web 29 to regain its unstressed condition, in which the passageway 39 is open, means have been provided for retracting the plunger 31 to an extent sufficient for this purpose. Such means consists of a lever 38, having depending spaced arms 39 and 40, which straddle the body 1 of the torch and are pivotally connected to the sides of the body 1, as by a pivot pin 41. The lever 38 is provided with a web portion 42 which interconnects the arms 39 and 40 and has a recess 43 in its lower edge for accommodating the rear portion of the plunger 31. The rear end of the plunger 31 is provided with a head 44, which may be formed integrally with the plunger, or may be a nut secured to the rear end of the plunger.

The plunger 31 is retracted by movement of the lever 38 in a counterclockwise direction about the pivot pin 41, and upon such retraction, the passageway 30 in the valve 26 is opened.

A combustible mixture of oxygen and fuel gas is carried into the chamber 9 by means of the injector nozzle 5, the mixture flowing from the chamber 9 through a venturi or passageway 45 of reduced cross-section in the body 1, and flowing from this passageway into the nozzle of the torch to provide a powder melting flame at the tip of the nozzle.

The powder falls by gravity from the hopper 21 into the opening 17, and if the passageway 30 in the valve 26 is open, the passage of the combustible gas mixture through the chamber 9 creates a partial vacuum in this chamber and provides an aspirator action for withdrawing powder from the chamber. The flow of powder depends partly on gravity and partly on suction of the aspirator, but the flow of powder is substantially proportional to the combustible mixture flow, because the suction of the aspirator depends upon the volume of combustible mixture discharged by the injector nozzle 5.

The presence of powder in the chamber 9 causes a decrease in the partial vacuum within this chamber, so that if there is any obstruction in the system downstream of the chamber 9, as, for example, an accumulation of carbon or other matter on the tip of the torch nozzle, there is a tendency for the direction of flow of the gas to be reversed. As a result, the combustible gas mixture accumulates in the chamber 9 and in the hopper 21, and in the passageways leading upwardly from this chamber, through which the powder drops into the chamber 9. This accumulated combustible gas mixture is ignited by the receding flame, and if the flame reaches the interior of the hopper, an explosion can result, which can cause serious injury to the user of the torch and/or destruction of the torch.

For the purpose of preventing the receding flame from reaching the interior of the hopper, I have provided means which, while preventing the receding flame from reaching the interior of the hopper, does not interfere, in any way, with the flow of the powder from the hopper, so that the torch can be used effectively without any fear of injury or damage as the result of flashback.

For this purpose, I have provided a disc-like element 50, which is inserted in the bottom of the hopper 21, and can be permanently brazed or otherwise secured to the hopper, or removably secured in the bottom of the hopper, as by threading, in the manner illustrated.

The element 50 is provided with from 10 to 15 holes or openings 51, about .020" in diameter, and more or less uniformly spaced from each other, each hole or opening being preferably about .015" to .060" in length.

Due to the number of openings 51, the total area provided by these openings is such as not to impede, in any way, the flow of powder through the element 50 during operation of the torch. At the same time, the diameter or size of the openings 51 is so small as to prevent the entry of the receding flame of the flashback into the hopper. Consequently, the torch can be used effectively without any fear of injury or damage as a result of the flashback.

It is sometimes desirable, in the operation of the torch, to provide means for preventing the valve 26 from being entirely closed, that is to say, to provide means for maintaining a passage through the valve which is of lesser area than the fully-open passageway through the valve. For example, if a coating operation of long duration is being performed, and a relatively small, but continuous uniform flow of powder is desired, it is desirable to obtain such a long, continuous, uniform flow, by partially closing the passageway 30 through the valve, while being relieved from the necessity of maintaining the lever 38 depressed throughout the coating operation. Also, in a coating operation, which continues from one day to another, it is desirable, once the passageway has been partially closed, to retain the reduced flow setting from one day to the next, without manipulation or adjustment of parts of the torch.

For this purpose, I have provided a screw 52 which is threadedly mounted in the web 42 of the lever 38. The screw 52 is provided with a slotted head 53, so that the screw can be adjusted with an ordinary screw driver.

In the position shown in FIG. 1, the screw 52 has been withdrawn to a position, in which it is of no effect, in that it does not prevent the plunger 31 from fully closing the valve 26.

If, however, the screw 52 is turned, so as to move it to the right, as viewed in FIG. 1, the toe of the screw will engage the rear wall of the body 1, and thus prevent the spring 34 from fully closing the valve. The passageway 30 of the valve will then be partially open, so that a smaller volume of powder can flow continuously through the valve. This reduced volume will be automatically retained throughout the coating operation, and without the necessity, at any time, of manipulating the lever 38. The screw can be adjusted, so that virtually any size opening can be effected through the valve, up to the maximum opening provided by the valve.

At any time that the valve 26 needs replacement, the lever 38 may be disconnected from the valve body 1, the plunger 31 retracted to permit access to and removal of the nut 36 from the bore 22, and the plunger and spring withdrawn from the bore 22. After this, the assembly consisting of the valve 26 and plug 33 may be pushed rearwardly from the bore 22, as by means of a pin inserted in the opening 25 and pushed against the plug.

It is thus seen that I have provided a torch having means incorporated therein for positively and accurately feeding or metering the powder to the chamber in the torch from which the powder is propelled to the nozzle or tip of the torch, and have also provided means for positively preventing backflash in the torch from reaching the powder in the hopper, without interfering with the flow of powder from the hopper.

Moreover, the torch is of such simple design or construction, consisting of a relatively small number of parts which can be quickly and easily assembled and disassembled, as to enable the torch to be sold at a low price, and in large volume.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a powder spray torch of the character described, a torch body having an injector assembly mounted therein, said body having aligned openings for the passage of powder into said injector assembly, said body having a cylindrical bore which is substantially parallel with said injector assembly and is intersected by said openings, said bore being closed at its forward end except for a small opening in the body which communicates with said bore and provides for the passage of a pin therethrough for the purpose of removing said valve through the rear end of said cylindrical bore, a valve of elastomeric material disposed in said cylindrical bore, said valve having a diameter substantially in excess of the diameter of said small opening, said valve having a vertical bridge section through which a vertically disposed powder metering passageway extends, which passageway is in alignment with said aligned openings, a plunger having a nose portion which engages said bridge section and exerts pressure thereon to close said powder metering passageway, a metallic plug adhesively secured in said valve at the side of said bridge section opposite that engaged by said nose portion providing a rigid seat for the bridge section and forming an integral and unitary structure with the valve, and a compression coil spring disposed in said cylindrical bore for closing said valve.

2. A powder spray torch, as defined in claim 1, including a nut secured to said body and which closes the rear end of said cylindrical bore, and serves as an abutment for one end of said spring, said plunger being slidable through said nut.

3. A powder spray torch, as defined in claim 2, including means for retracting said plunger to permit said bridge section to regain its unstressed condition, in which condition said metering passageway is open.

4. A powder spray torch, as defined in claim 3, in which said means comprises a lever having depending spaced arms which straddle said body and are pivotally connected to said body.

5. A powder spray torch, as defined in claim 4, wherein the walls of said cylindrical bore are provided with longitudinally-extending grooves, and said valve is provided with ribs which extend through said grooves, said grooves and ribs coacting to prevent rotation of said valve in said bore.

6. In a powder spray torch of the character described, a torch body, a powder-containing hopper mounted on said body, and means disposed in the bottom of said hopper for preventing a receding flame in said torch from reaching the interior of said hopper, said means comprising a disk-like element having a multiplicity of spaced openings therein, said openings being open at all times.

7. A powder spray torch, as defined in claim 6, wherein said openings are about .020" in diameter and about .015" to .060" in length.

8. In a powder spray torch of the character described, a torch body having a passageway therethrough for the flow of a combustible gas mixture, a powder-containing hopper mounted on said body for supplying powder from said hopper to said passageway, a normally-closed valve interposed between said hopper and passageway for metering the flow of powder to said passageway, and means independent of said valve and disposed adjacent the bottom of said hopper for preventing a receding flame in said passageway from reaching the interior of said hopper, said means comprising a disk-like element having a multiplicity of spaced openings therein, of such size and number as to permit free flow of powder therethrough during normal operation of the torch, but the openings being so small in diameter as to prevent the entry of such receding flame into the hopper.

9. A powder spray torch, as defined in claim 8, wherein said openings are about .020" in diameter and about .015" to .060" in length.

References Cited

UNITED STATES PATENTS

| | | | |
|---|---|---|---|
| 2,786,779 | 3/1957 | Long et al. | 239—85 |
| 3,190,560 | 6/1965 | Schilling et al. | 239—85 |
| 3,194,501 | 7/1965 | Cape | 239—85 |
| 3,281,077 | 10/1966 | Cape | 239—85 |
| 3,281,078 | 10/1966 | Cape | 239—85 |
| 3,228,610 | 1/1966 | Quaas et al. | 239—85 |

EVERETT W. KIRBY, *Primary Examiner.*

U.S. Cl. X.R.

239—586